B. C. BLOMSTEN.

Improvement in Plows.

No. 4,810. Reissued March 19, 1872.

Witnesses.
C. F. Brown.
S. J. Hayes.

Inventor.
B. C. Blomsten
By H. W. Beadle,
Atty.

UNITED STATES PATENT OFFICE.

BENGT C. BLOMSTEN, OF WAUPACA, WISCONSIN.

IMPROVEMENT IN PLOWS.

Specification forming part of Letters Patent No. 108,095, dated October 11, 1870; reissue No. 4,810, dated March 19, 1872.

*To all whom it may concern:*

Be it known that I, BENGT C. BLOMSTEN, of Waupaca, in the county of Waupaca and State of Wisconsin, have invented certain Improvements in Plows, of which the following is a specification:

This invention relates to that class of plows which are provided with adjustable mold-boards; and consists in certain details of construction which will be fully described hereinafter.

Figure 1:
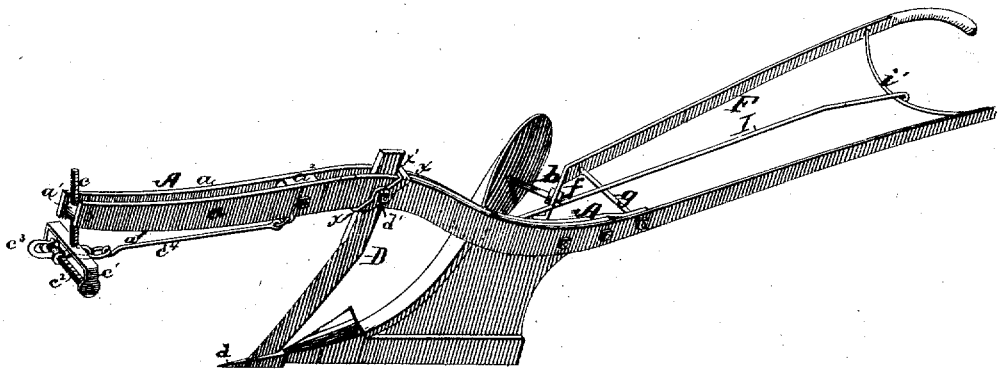
Figure 3:
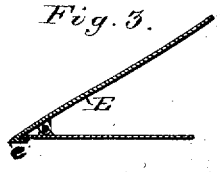
Figure 2:
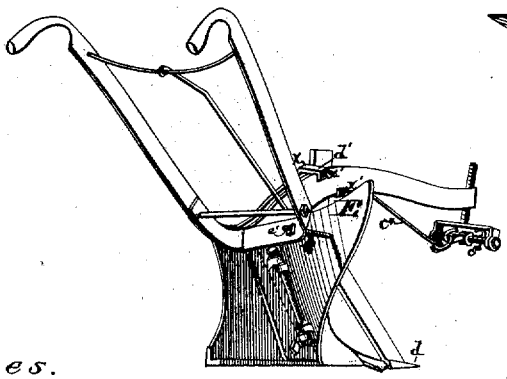
Figure 4:
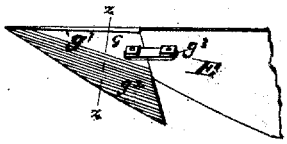
Figure 5:
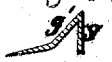

In the drawing, Figures 1 and 2 represent perspective views of my improved plow; Figs. 3, 4, and 5, views of parts detached; and Fig. 6, a plan view of the mold-board and point.

To enable others skilled in the art to make and use my invention, I will now proceed to describe fully its construction and manner of operation.

My improved plow may be generally described as follows: It is constructed preferably entirely of metal. The beam consists of two metallic bars united together by bolts, between which bars the land-side is secured, and also proper blocks, for other purposes. One of the bars is extended rearward and forms the left handle of the plow. The other handle is formed of a separate bar peculiarly bent and secured to the handle by tie-rods, and to the beam by bolting. Between the bars of the beam the colter is secured in a novel manner, and also the pivot-block of the draft device. To the land-side is secured the mold-board and sole of the plow. The point is secured to the mold-board.

Figure 6:
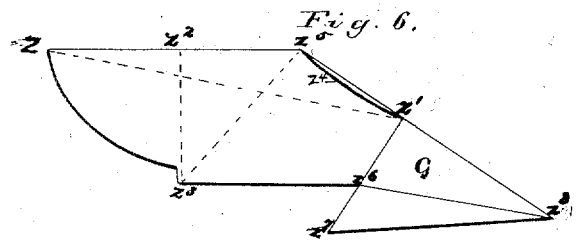

The parts will now be described in detail: *a a* represent the metallic bars which constitute the beam, one of which extends rearward and forms the left handle of the plow, as clearly shown in Fig. 1. These bars are securely united together by bolts at proper points, an intervening space between the two, however, being formed by the interposition of the upper edge of the land-side, the block $a^2$ and the pivot-block $a^1$ of the draft device. By means of this peculiar construction great strength is secured with lightness, the union of the bars in this manner forming of light material a rigid beam of great strength. The device for regulating the draft will now be described. *c* represents a threaded rod, which is held in a threaded socket in the pivot-block, $a^1$. To the lower end of this threaded rod is attached a clevis, $c^1$, having bearings in its pendent ears, in which bearings rests a threaded rod, $c^2$. $c^3$ represents a double-draft device having a hook extending front and rear, each united to a threaded socket inclosing the rod $c^2$, as shown. $c^4$ represents a draft-rod connected by links to the rear hook of the double device $c^3$ and to the hook of the stationary block $a^2$. By means of this construction the desired vertical and lateral adjustments are easily effected. To adjust the draft vertically the clevis $c^1$ is swung backward by partially revolving the pivot-block $a^1$, until the draft-rod can be disconnected from the rear hook of the device $c^3$, when the clevis $c^1$ will be free to revolve horizontally, by which means the threaded rod *c* will be caused to travel up or down in its socket in the pivot-block, and thus change the position of the clevis vertically relative to the beam. When the desired change has been made the draft-rod should be again, of course, attached to the draft-hook. To adjust the draft laterally the threaded bolt $c^1$ is simply revolved in its bearings, by which means the draft device $c^3$, the socket of which is, in fact, a screw-nut, is compelled to travel to one side or the other, as it cannot revolve with the bolt on account of its hooks coming in contact with the clevis, and also on account of its connection with the draft-rod. D represents the colter, which may be either made plain or be provided with a point, *d*, having a socket at its rear end to receive the front end of the plow-point, as shown in Figs. 1 and 2. The upper end of the colter is placed between the bars of the beam, and is secured in place by means of a peculiarly-shaped iron, $d'$. This iron consists of a suitable piece of metal bent at $x\ x\ x'\ x'$, for the purpose of enabling it to grasp the beam and confine the colter. In addition to the bends indicated it has a longitudinal bend, so that when in position its middle portion lies at an angle across the face of the beam, while the upper and lower bearing parts rest squarely upon the upper and lower edges of the beam. By means of this construction it is rendered capable of holding the colter from displacement above and below. The clamping action of this iron is caused by a screw-bolt, the inner end of which presses against the beam. By means of this construction the two bars of the beam are drawn tightly together when the bolt is operated, and the colter is tightly grasped between them. In addition to this clamping action the colter has a positive bearing above and below upon the clamping-iron itself. The mold-board E will now be described. It is hinged to the land-side by means of ears and a securing-rod, as clearly shown in Figs. 2 and 3. Its front edge, *e*, is made to project over the front edge of the land-side, as shown in Figs. 1 and 3, in such manner as to protect the latter without interfering with its own swinging movement. Its adjustment to cut a wide or narrow furrow is accomplished by means of a threaded rod, $e^1$, attached at one end to the mold-board, and held at the other by means of nuts in a slotted opening in the right-hand handle. By means of the slot the rod is enabled to adjust itself laterally in accordance with the varying position of the mold-board—that is, the mold-board being caused to swing upon its pivots, it must necessarily move longitudinally and laterally. By adjusting the nuts upon the rod $e^1$ the longitudinal adjustment is provided for, and by moving the rod in the slotted opening the lateral adjustment is permitted. As a large portion of the pressure received by the mold-board is borne by the rod $e^2$ it becomes necessary to give it ample support. This is accomplished by giving it a bearing in the bent end *f* of the left handle F, which forms, with the beam A and brace-rod *g*, a resisting triangle of great strength. The shape of the mold-board is also peculiar. The lines of its curvature are indicated in Fig. 6, which is about one-twentieth of the full size. The line $z\,z^1$ represents the extreme length of the mold-board, which, in a medium-sized plow, is two feet and six inches. The line $z^2\,z^3$ represents the extreme width, which is eleven and one-half inches. The line $z^1\,z^5$ represents the part to which the land-side is attached, which is ten and one-half inches. The line $z^3\,z^6$ represents the lower bearing edge; $z\,z^5$, the upper edge; and $z^4$ represents the curve of the line $z^5\,z^1$, which, at its deepest part, varies three-fourths of an inch from a straight line between the points. The lines of curvature are indicated by the dotted lines $z\,z^1$ and $z^3\,z^5$, the first being concave with an extreme depth of three inches, and the latter convex with an elevation of two inches. The point G is also peculiar; in addition to the side piece *g*, it has also a penetrating portion, $g^1$, the wing $g^3$ of which extends beyond the line $z^3\,z^6$, Fig. 6, of the mold-board, as shown. The point has a concave curve on the line $z^1\,z^7$, so that the extended part $z^6\,z^7$ lies close to the ground, as shown in Fig. 5. The line $z^1\,z^7$, Fig. 6, represents the extreme width of the point, which, in a medium-sized plow, is twelve inches. The line $z^7\,z^8$, the extreme length, which is twenty inches, and $z^1\,z^8$ the edge adjacent to the land-side, which is twelve inches. The extreme concave curve upon the line $z^1\,z^7$ is one-half an inch. The mold-board is connected to the point by means of a link, $g^3$, as shown in Fig. 4. The sole of the plow is bolted to the land-side, and a rigid connection is made between it, the land-side, and the point by means of a strengthening-piece shown in Fig. 2. The handles are properly braced by iron rods, and they are moreover provided with a bent bar, I, bolted to the beam at its front end, and united to them at its rear end by a curved rod, *i*, which curving-bar being somewhat in the form of the arch connects the handles rigidly to the beam.

By means of the peculiar construction described, the plow possesses many marked advantages, as follows: By constructing the beam of metal bars, and by arranging the handles as described, great strength is secured with light material. From the peculiar shape of the mold-board it is well adapted to clear itself, and it runs light and scours bright even in black sticky mud. From the peculiar construction of the point it is adapted to penetrate with a drawing cut, and consequently it easily severs roots, &c., that it comes in contact with. Moreover, as the outer edge lies flat with the ground, the point will not be injured by wearing off until it is worn up to the line of the mold-board, although it may require sharpening at times.

The draft attachment is simple and provided for easy adjustment, either laterally or vertically. The mold-board, by means of its adjustability, is well adapted for either cross or stubble plowing. The colter is doubly held, being secured by friction between the bars and by the arms of the clamping-iron. The plow as a whole is simple in its construction and exceedingly effective in operation.

Having thus fully described my invention, what I claim as new, and desire to secure by Letters Patent, is—

1. The combination of the beam A, constructed as described, with the colter and clamping-iron, as and for the purpose set forth.

2. The draft device described, consisting of the threaded rod *c*, pivot-block *a*, clevis $c^1$, threaded rod $c^2$, draft-hook $c^3$, and rod $c^4$, in combination, as and for the purpose set forth.

3. In a hinged mold-board, the turned edge *e*, adapted to cover the front edge of the land-side, as described.

4. The resisting triangle, formed of the beam A, bent-arm *f* of handle F, and brace-rod *g*, in combination with the hinged mold-board and rod $e^1$, as described.

5. The plow described, consisting of the beam A, handles, mold-board E, point G, colter D, brace-rod I, and draft attachment, when combined as described, for the purpose set forth.

BENGT C. BLOMSTEN.

Witnesses:
CLAYTON L. HAYLEY,
O. J. DREATZEN.